Patented Mar. 10, 1936

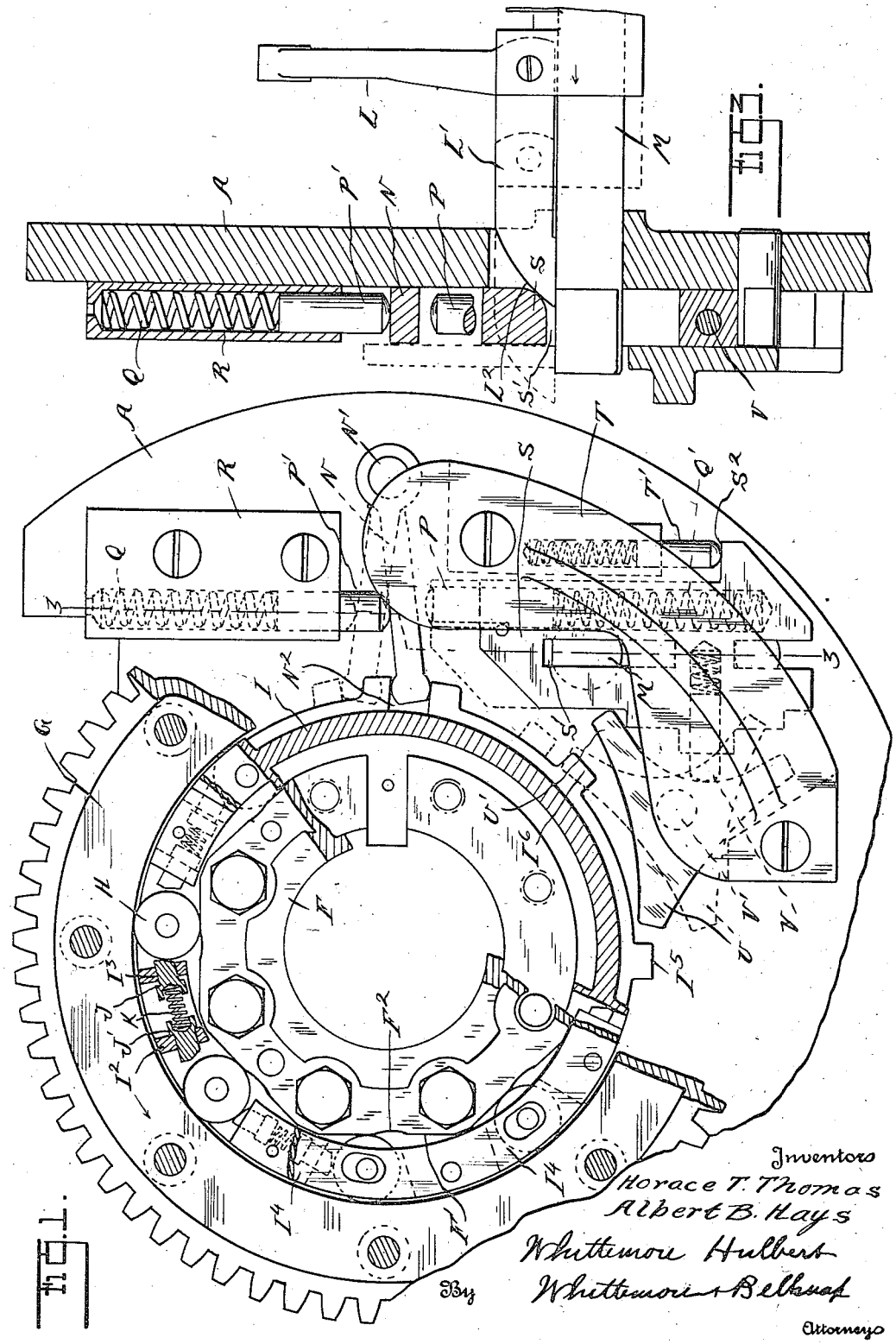

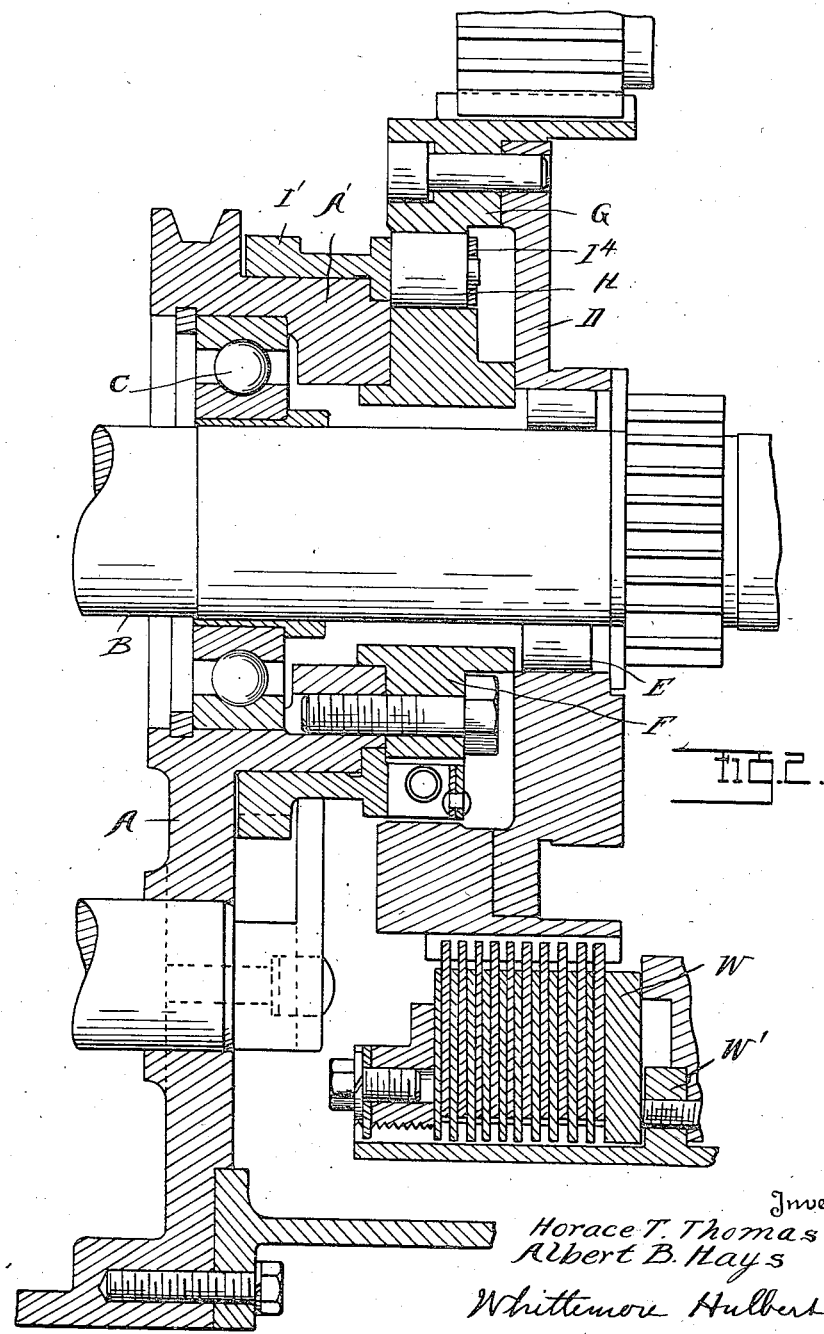

2,033,362

UNITED STATES PATENT OFFICE 2,033,362

ONE-WAY BRAKE

Horace T. Thomas and Albert B. Hays, Lansing, Mich., assignors to Reo Motor Car Company, Lansing, Mich., a corporation of Michigan Application August 29, 1932, Serial No. 630,968

2 Claims. (Cl. 188—81)

The invention relates to one-way brakes which are constructed to permit one member to rotate in one direction in advance of another member, but preventing relative rotation of said members in the opposite direction. For certain uses, such for instance as in connection with transmission mechanisms, it is desirable under certain conditions to reverse the operation of such one-way brake, and it is the object of the present invention to obtain a simple and effective construction for this purpose. To this end the invention consists in the construction as hereinafter set forth.

In the drawings:

Figure 1 is a sectional elevation of the one-way brake showing the same in connection with certain elements of a transmission mechanism;

Figure 2 is a longitudinal section through Figure 1;

Figure 3 is a section taken substantially upon line 3—3 of Figure 1.

While the improved one-way brake may be used for various purposes as illustrated, it is specifically designed for use in connection with a planetary transmission gearing which includes a reverse drive. The detailed construction of this planetary gearing is complex and forms no part of the present invention and therefore in the drawings certain elements only are shown in their relation to the overrunning clutch.

As shown, A is a stationary housing for enclosing the mechanism of the transmission, B is a shaft journaled in this housing on ball bearings C, and D is an independently rotatable member journaled on the shaft B through the medium of a roller bearing E. The member D is designed as a carrier for a planetary gear of the transmission, and where power is transmitted through this gear, it will tend to drive the carrier in reverse direction. On the other hand, for direct driving the carrier D must be free to rotate with the driven member. Again, when the transmission is in reverse and power is transmitted through the planetary gear, this will tend to drive the carrier D in a forward direction. To meet these conditions requires a construction which will hold the carrier D against rearward thrust during forward drive through the planetary gear, which will also permit free rotation of the carrier in a forward direction when the transmission is in high and which during reverse drive through the planetary gear will hold the carrier D against thrust in a forward direction. All of these functions are performed by a reversible one-way brake which is constructed as follows:

F is a member mounted on the stationary housing A surrounding the shaft B and concentric therewith. The periphery of this member F is of polygonal form and each of the faces F' is provided with a central notch or recess $F^2$. G is an annular race member surrounding the member F and secured to the member D. Between the members F and G is arranged a series of rollers H mounted in an adjustable ring carrier or retainer I which in neutral position will locate each of the rolls in the corresponding recesses $F^2$ of the polygonal faces E'. The ring carrier I has a portion I' which is rotatively mounted on a bearing A' on the housing A. Projecting laterally from this portion I' are lugs $I^2$ which extend between the rollers H. Each of these lugs is recessed at $I^3$ to receive headed pins J which latter project through apertures in the opposite walls of the recess to extend into proximity to the surface of the rolls H. The heads of the pins J' are cupped to receive springs K which yieldably thrust the pins in opposite directions until stopped by the heads abutting the lugs. $I^4$ is a ring secured to the outer ends of the lugs $I^2$ to complete the pockets for holding the rollers H.

With the construction just described when the ring $I^4$ is positioned to locate the rolls H in the recesses $F^2$, the member D is free to revolve in either direction without resistance. If, however, the ring is moved into the position shown in Figure 1, the rolls will be carried on to the polygonal faces F' and into frictional contact with the inner periphery of the raceway G. In this position any stress tending to rotate the member D in a clockwise direction will instantaneously lock the brake by the wedging of the rolls between the raceway and the polygonal faces F', but the member D is still free to rotate in an anti-clockwise direction as indicated by the arrow. This is because the initial reverse rotation will move the rolls out of wedging engagement, the spring pressed pins J yielding to permit of this movement.

To reverse the operation of the brake, the ring I is rotatably adjusted in the opposite direction or anti-clockwise as shown in Figure 1. This will transfer the rolls to the opposite side of the recesses $F^2$ causing them to wedge and lock when the member D is stressed in an anti-clockwise direction and permitting free rotation of the member D in a clockwise direction.

In transmissions which are provided with one or more shiftable gears, it is usual to control the same by gear shifting forks which are slidable upon guide rods. In the construction illustrated, L is a shifter fork for controlling the reversible mechanism of the transmission (not shown) and M is the guide rod on which said fork is slidable. The reversing of the one-way brake is preferably automatically controlled by the movement of the shifter fork L by mechanism of the following construction:

N is a rockable lever pivoted at N' to the stationary housing A and having its free end engaging a recess $N^2$ in the ring I. P and P' are pins bearing against opposite sides of the lever N and yieldably pressed thereagainst by springs Q, Q' in socket members R and S mounted on the stationary housing A. The member R is fixed in position on the housing A but the member S is in the form of a slide movable in a guideway T in a direction towards or from the lever N. L' is a cam connected to the shifter fork L having a tapering nose piece $L^2$ which engages a slot S' in the member S. The arrangement is such that when the shifter L is moved in the direction indicated by the arrow, Figure 3, the tapering nose $L^2$ entering the slot S' will force the slide S upward compressing the spring Q' and causing it to move the pin P and lever N against the pin P' under the tension of the spring Q or into the position shown in dotted lines, Figure 1. A reverse movement of the shifter L back into the position shown in Figure 3 will lower the slide S, permitting the pin P and spring Q to move the lever N downward or into the position shown in full lines, Figure 1. This downward movement of the slide S is insured by the pressure of a spring pressed pin T' in the member T bearing against a shoulder $S^2$ on the member S. Thus in the position indicated in full lines in Figures 1 and 3, the lever N and ring I are held in a position where the member D is free to rotate in an anti-clockwise direction, Figure 1, but is locked against movement in a clockwise direction. When, on the other hand, the position of the parts is as indicated in dotted lines, Figures 1 and 3, the member D will be free to rotate in a clockwise direction but will be locked against movement in an anti-clockwise direction.

A safety catch is preferably placed in connection with the adjustable ring I which as shown in Figure 1 consists of a star wheel U having one prong thereof in contact with the periphery of the ring I and in the path of a lug $I^5$ thereon. The star wheel is held in this position by the pressure of a spring pressed pin V carried by the slide S which in the position of parts shown in Figure 1, is below the pivotal center V' of said star wheel. When, however, the slide S is moved into dotted position, this will transfer the pressure of the pin V to the opposite side of the center V' causing a slight rotation of the star wheel to withdraw the prong U and to press the prong U' into contact with the periphery of the ring I and in the path of a lug $I^6$ on said ring. This movement of the star wheel is accomplished at the same time that the ring I is shifted by the operation of the lever N, so that in each position of said ring the star wheel in cooperation with the lugs $I^5$, $I^6$ will lock it from accidental displacement.

It has been stated that the ring V may under certain conditions be driven in the direction which is permitted by the one-way brake. This may be accomplished by any suitable construction in the transmission mechanism, but as indicated in Figure 2 W is a friction clutch for coupling the member D to a member W' forming a part of the high speed driven member. However, as this forms no part of the present invention further description of the same will be omitted.

What we claim as our invention is:

1. In a transmission gearing of the planetary gear type, the combination with a revoluble planetary gear carrier having an annular raceway, of a polygonal member having its faces opposed to said raceway, rollers intermediate said faces and said raceway, having clearance when at an intermediate point in each face, a retainer carrier for said rollers rotatively adjustable in relation to said polygonal member to carry said rollers alternatively to one side or the other of said intermediate point and into frictional contact with said raceway, a shifter for altering the direction of rotative stress on said revoluble carrier, and coacting mechanism between said shifter and said carrier comprising a rockable lever for rotatively adjusting said shifter, resiliently yieldable members on opposite sides of said rockable lever, and means actuated by said shifter for alternatively increasing or diminishing the yieldable pressure on one side of said lever to correspondingly adjust said carrier.

2. In a transmission gearing of the planetary gear type, the combination with a revoluble planetary gear carrier having an annular raceway, of a polygonal member having its faces opposed to said raceway, rollers intermediate said faces and said raceway, having clearance when at an intermediate point in each face, a retainer carrier for said rollers rotatively adjustable in relation to said polygonal member to carry said rollers alternatively to one side or the other of said intermediate point and into frictional contact with said raceway, a shifter for altering the direction of rotative stress on said revoluble carrier, and coacting mechanism between said shifter and said carrier comprising a rockable lever for rotatively adjusting said retainer, resiliently yieldable members on opposite sides of said rockable lever, means actuated by said shifter for alternatively increasing or diminishing the yieldable pressure on one side of said lever to correspondingly adjust said carrier, and a safety catch also adjusted by the movement of said shifter to hold said carrier in its adjusted position.

HORACE T. THOMAS.
ALBERT B. HAYS.